Oct. 9, 1956        G. W. MERRITT        2,766,417
BELT DRIVE ACTUATED MOTOR CONTROLLING SWITCH MECHANISM
Filed Aug. 9, 1952        3 Sheets-Sheet 1

INVENTOR
Glenn W. Merritt

BY   W. V. McDowell
ATTORNEY

Oct. 9, 1956  G. W. MERRITT  2,766,417
BELT DRIVE ACTUATED MOTOR CONTROLLING SWITCH MECHANISM
Filed Aug. 9, 1952  3 Sheets-Sheet 2

INVENTOR
Glenn W. Merritt

BY W. S. McDowell
ATTORNEY

Oct. 9, 1956
G. W. MERRITT
2,766,417
BELT DRIVE ACTUATED MOTOR CONTROLLING SWITCH MECHANISM
Filed Aug. 9, 1952
3 Sheets-Sheet 3
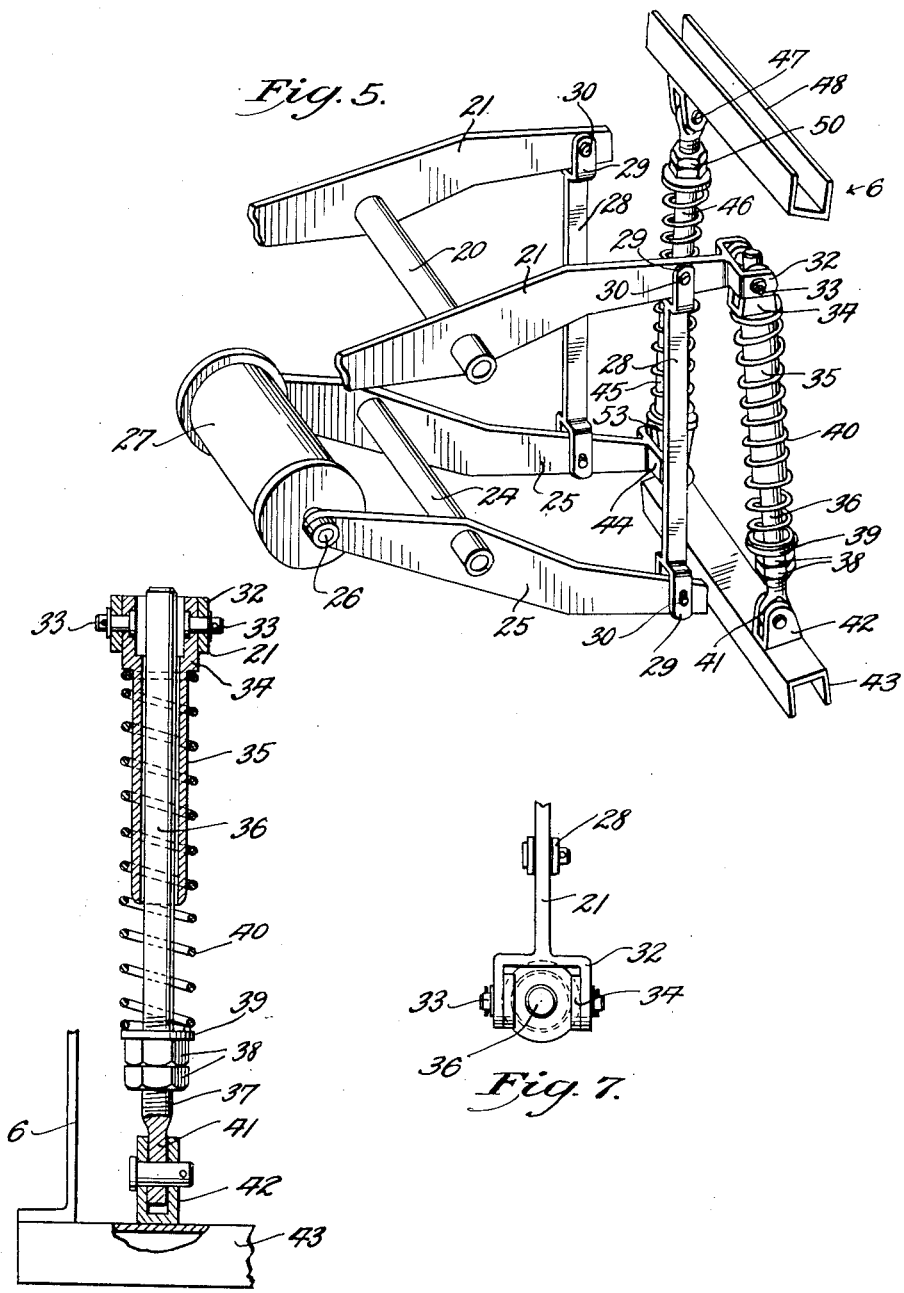
INVENTOR
*Glenn W. Merritt*
BY *W. S. McDowell*
ATTORNEY

United States Patent Office 2,766,417
Patented Oct. 9, 1956

2,766,417

BELT DRIVE ACTUATED MOTOR CONTROLLING SWITCH MECHANISM

Glenn W. Merritt, Bowerston, Ohio, assignor to The Nolan Company, Bowerston, Ohio, a corporation of Ohio Application August 9, 1952, Serial No. 303,493

2 Claims. (Cl. 318—475)

This invention relates to automatically operating load-responsive electric switches, having particular reference to switches of the type employed in belt drives in preventing the overloading of electric motors utilized in operating various kinds of associated apparatus.

In my prior co-pending application, Serial No. 282,038, filed April 12, 1952, I have disclosed a protective switch device for protecting electric motors. This switch device is so formed as to be responsive to torque effort developed by such motors to open automatically their operating circuits when overloads of predetermined degree are applied thereto.

Further, this earlier switch device, while of such form as to furnish effective protection for motors rotating in one direction, or motors of the non-reversible type, is ineffective for furnishing protection against the deleterious effects of overloading when the motors are capable of running in either direction of armature rotation.

An object of the invention, therefore, is to provide an improved automatically operating cut-out switch mechanism adapted for use in conjunction with electric motors used in operating endless belt drives, and wherein said mechanism will furnish complete over-loading protection for such motors irrespective of their directions of rotation.

Another object of the invention resides in providing a protective switch mechanism for preventing the overloading of reversible electric motor driven apparatus in which the switch mechanism includes operating members arranged for engagement with the opposite runs of an endless belt drive employed in transmitting the power of such motors to apparatus driven thereby, the operating members of the switch mechanism responding to changes in the degree of slack present in the endless belt means to move said members in a manner controlling the operation of the switch mechanism and the motor circuit or circuits associated therewith.

With these and other objects in view, which will appear as the description proceeds, the invention accordingly consists in the novel features of construction, combination of elements, and arrangement of parts, hereinafter more fully described and set forth in the appended claims.

In the accompanying drawings, which form a part of this specification, and in which similar character of reference denote like and corresponding parts in all the views thereof:

Fig. 5 is a detail perspective view of the roller-equipped operating arms of the switch mechanism comprising the present invention.

Fig. 6 is a vertical sectional view taken through the spring actuated telescopic linkage uniting the roller carrying arms with the stationary frame of the switch mechanism.

Fig. 7 is a detail plan view, disclosing the bifurcated end of one of the switch-operating arms and its associated telescopic connection.

Figure 1:
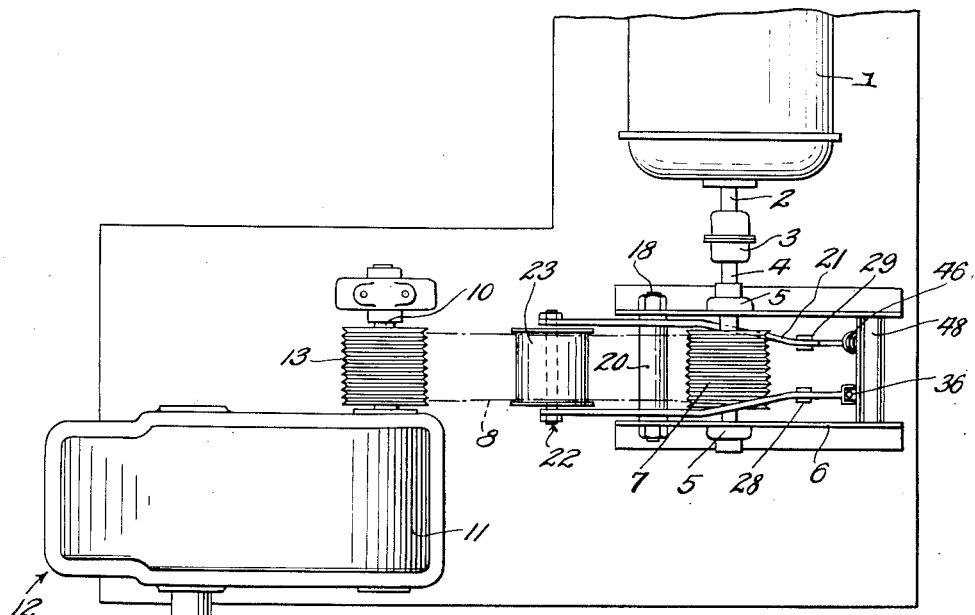
Fig. 1 is a top plan view of an electric motor-actuated endless belt drive provided with the overload-controlling switch mechanism of the present invention.

Referring more particularly to the drawings, there has been indicated at 1 any suitable type of a reversible electric motor. In this instance, the armature shaft 2 of such a motor is coupled, as at 3, with a longitudinally aligned drive shaft 4, the latter being mounted for rotation in spaced bearings 5 formed in connection with the side members of a stationary switch frame 6. Between the bearings 5, the drive shaft has fixed thereto for rotation a belt wheel 7, the latter being formed, in this instance, with a plurality of annular grooves which are adapted to receive a plurality of endless parallelly arranged drive belts 8. Each of the latter may be substantially V-shaped in transverse cross sections, but it will be understood that other types of belt drives may be used.

A driven shaft 10, projecting from the casing 11 of a speed-reducing mechanism 12, or other means driven by the motor, is arranged in spaced parallelism with the drive shaft 4. The shaft 10 carries, in this instance, a multiple-groove belt wheel 13 disposed in registry with the belt wheel 7, and around which pass the endless belts 8. Through the use of this mechanism, power derived from the motor 1 is employed to drive the parts of the speed-reducing mechanism 12, or other load-producing apparatus. An endless power-transmitting drive is utilized, as is common in a large number of machines or devices of this nature. It will be understood, however, that I do not limit the present invention to the specific arrangement set forth, but reserve the right to employ various types of endless and flexible power-transmitting apparatus suitable for the purposes of this invention.

Figures 4, 8:
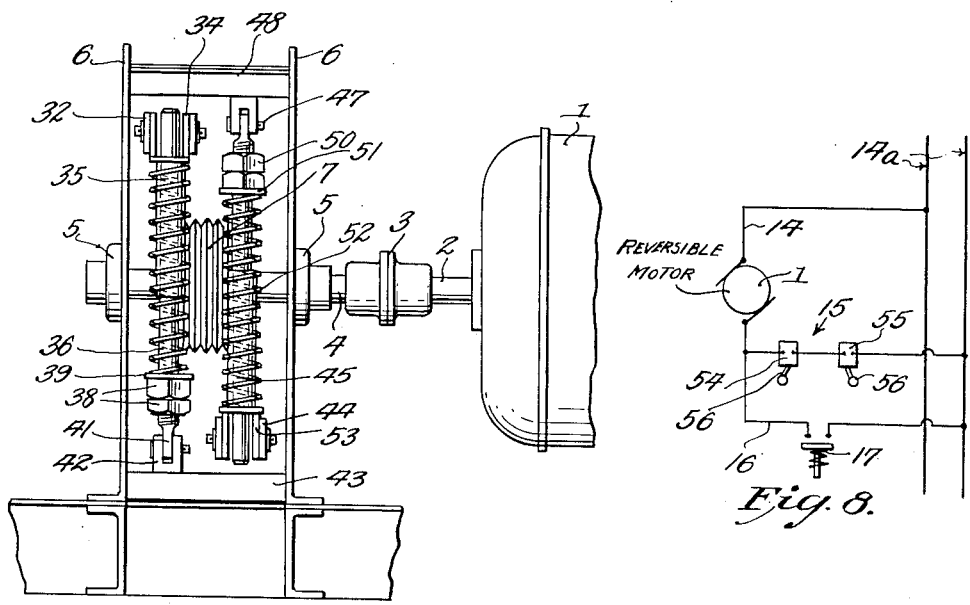
Fig. 4 is an end elevational view thereof.
Fig. 8 is a diagrammatic view, disclosing the circuit arrangement provided for the switch mechanism of the present invention.

As shown in Fig. 8, the motor 1 is arranged in a main circuit 14, the latter being joined with power-conducting trunk leads 14a. Positioned in the circuit 14 is the overload switch assembly 15 of the present invention and which is adapted to be automatically operated to open the circuit 14 when the motor 1 sustains predetermined overloads. This operation of the switch assembly is set up by the application of high working loads applied on the speed-reducing mechanism 12, or other apparatus driven by the motor. The switch 15 may, if desired, be supplemented by a normally open manually operated switch 17, located in the shunt circuit 16, and which permits of the starting and stopping of the reversible motor independently of the switch assembly. The arrangement provided is such that the automatically operated switch assembly may be shunted out of the motor-controlling circuit 14 whenever such manual control is advantageous in the operation of the motor-driven apparatus.

When the motor is first started, as will hereinafter be more fully explained, the apparatus is controlled by the manual switch 17, since at this stage the switch assembly 15 will be opened and the main motor circuit therethrough interrupted by the torque effort exerted by the motor on the belts 8. With the manual control for the motor provided by the switch 17, the operator of the apparatus may observe closely, and at first hand, just how the apparatus is working. If, as a result, of excessive motor torque, an objectionable condition is created, or found to exist, the same may be at once arrested by the release of the switch 17 so that the motor circuit 14 and 16 will be opened and the motor thereby de-energized.

In governing the operation of the automatic overload switch assembly 15, the frame 6 of the drive mechanism includes stationary upper and lower horizontally extending cross shafts 18 and 19, respectively, the shaft 18 being arranged above the upper runs $a$ of the drive belts 8, while the lower of said shafts is located below the lower runs $b$ of said belts.

Figure 3:
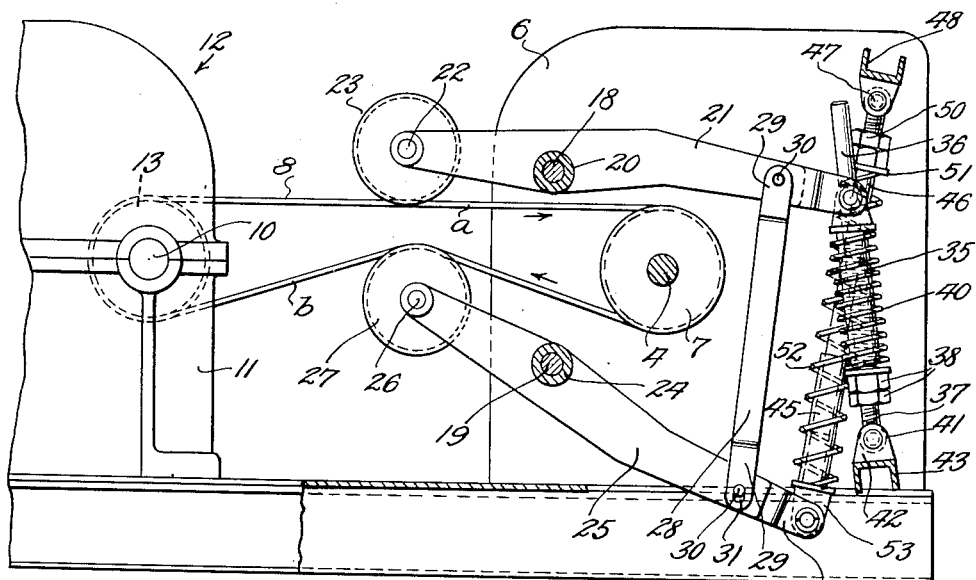
Fig. 3 is a vertical longitudinal sectional view taken through the mechanism. In this figure the upper run of the belt drive is shown in an elevated position with the removal of slack therefrom.

Mounted for rotation on the upper shaft 18 is a sleeve 20, which carries rigidly therewith a pair of rocker arms 21. The forward ends of these arms include a cross rod 22 for the rotatable support of a plain-surfaced roller 23, the latter being maintained in constant contact with the upper runs $a$ of the belts 8 in all positions thereof. Similarly, the lower of the shafts 19 is provided with a sleeve 24 which is joined with a pair of lower rocker arms 25. The forward ends of these lower arms are equipped with a cross rod 26 upon which is rotatably mounted a roller 27, the latter being normally maintained in contact in all operating positions with the belts comprising the lower runs of the endless power-transmitting means. The roller 27 engages with the lower runs ($b$) of the belt drive, and is spring loaded in a manner causing the roller 27 to move upwardly against the drive belts. Similarly, the roller 23 is spring pressed in a direction tending to move the same downwardly against the upper runs of the drive belts. As shown more particularly in Fig. 5, the rocker arms 21 and 25 are joined for movement in unison by means of the links disclosed at 28. The latter are provided with bifurcated upper and lower ends 29, which are pivotally united, as at 30, to said rocker arms. The ends 30 which unite the lower ends of the link 28 with the rocker arms 25 may be positioned in elongated slots 31, as shown more particularly in Fig. 3, these slots being formed in the rocker arms themselves. By the use of the slots 31 limited relative movement between the rocker arms is provided.

In order to apply spring pressure to the rocker arms, so that the belt-engaging rollers 23 and 27 thereof will be maintained constantly in contact with the upper and lower runs of the drive belts and in all operating positions of said belts, one of the arms 21, as shown in Fig. 5, terminates rearwardly in a yoke shape extension 32. This extension is apertured to receive pivot pins 33, the latter passing through registering apertures formed in the bifurcated upper end 34 of a tubular member 35. Slidably positioned in the tubular member is a rod 36, the lower end of which is threaded as at 37 to receive positioning nuts 38 which adjustably support on the rod a collar 39. A coil spring 40 surrounds the tubular member 35 and, also, the rod 40, the upper end of the spring engaging a shoulder formed with the bifurcated end 34 of said tubular member, while the lower end of the spring is seated on the upper surface of the collar 39. At its extreme lower end the rod 36 is formed with an eye 41, which is adapted to be received between a pair of apertured ears 42 arising from a transversely extending channel member 43 which forms a part of the belt frame 6. It will be observed that the expansion of the spring 40 will serve to swing the rocker arms 21 to positions maintaining the roller 23 in contact at all times with the upper runs of the drive belts 8.

Similarly, one of the lower rocker arms 25 is formed at one end with a yoke-shaped extension 44. Pivotally connected to the extension 44 is a tubular member 45, which corresponds to the member 35, except that the same is reversed in its operating position. The member 45 receives for telescopic movement a rod 46, the latter corresponding to the previously described rod 36. The upper end of the rod 46 is pivoted as at 47 to a channel shaped frame member 48 in the same manner that the lower end of the rod 37 is pivotally secured to the channel member 43. The rod 46 carries on its threaded end nuts 50 which form an adjustable position-controlling means for a collar 51, corresponding to the collar 39. A coil spring 52 is confined between the collar 51 and the bifurcated lower ends 53 of the tubular member 45, the spring 52 serving to force downwardly on the outer ends of the rock arms 25, so that the latter will turn about the shaft 19 and thereby maintain the roller 27 in constant engagement with the lower runs ($b$) of the conveyor belts in all the operating positions of the latter.

Figure 2:
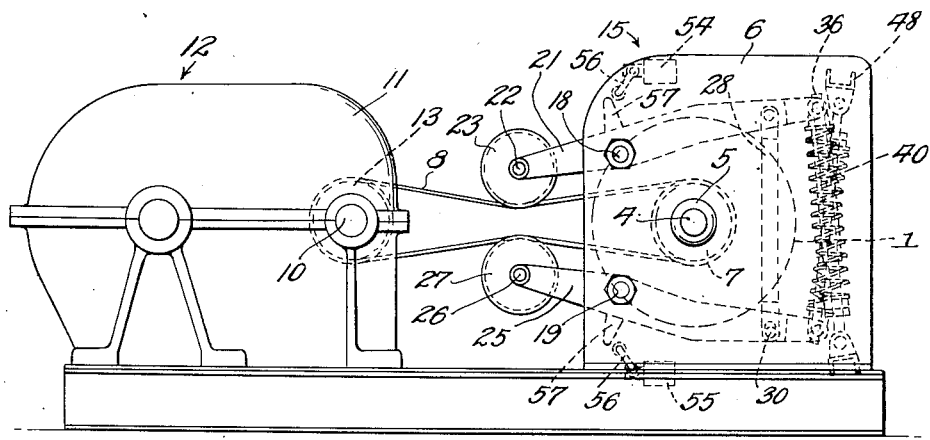
Fig. 2 is a side elevational view of the mechanism illustrated in Fig. 1.

As shown more particularly in Fig. 2, the frame 6 has mounted thereon switch units 54 and 55 of the overload switch assembly 15, each of said units being equipped with a conventional pivoted operating lever 56. Each set of the rocker arms carries an actuating lug 57 which is arranged in the path of movement of the operating lever 56 of an associated limit switch, so that as said rock arms move in response to variations in the operating positions of the conveyor belt runs ($a$) and ($b$) as the working load on the operating motor increases or decreases, the said switch units will be operated to open the operating circuit 14 in which the motor is situated. It will be noted that it does not make any difference in which direction the motor armature is running, since the switch mechanism 15 will function to arrest the motor operation when a predetermined overload is applied thereto.

An accepted practice in machine design is to provide means to take advantage of the ability of an electric motor to exert 200% to 300%, on occasion, of its rated torque for starting loads. In accordance with the present invention, I propose that the motor be started by push-button or manual control, with the manual switch bypassing the safety overload switch assembly 15 of the apparatus. In other words, as long as the machine operator maintains the push-button switch in its position of circuit closure, the machine will function while the motor is exerting up to 300%, if available, of its torque. The value of this design resides in the fact that while the machine operator is holding the manual switch closed, he can avail himself, because of his close proximity to the apparatus, of his senses of hearing and sight. Thus, the manual switch may be immediately opened and the operation of the motor 1 arrested if there is any jamming or deleterious action of the apparatus driven by the motor. Ordinary protective devices now commonly employed in such motor controls are in many intances responsive to motor heat, and normally consume two (2) to three (3) seconds before heat becomes effective in operating the associated thermally-responsive overload switches.

It is after the operator has started the machine that the automatic protection afforded by the present invention is especially effected. I can set my improved torque control device so that it will cut out the motor any where from 100 to 200% of its normal rated torque capacity. Usually I would set the device at 150% of said capacity, so that the motor would only come up in torque to the factor of one and one half (1½), which is used in the design of various parts of the machine driven by the motor.

While many of the advantages are present in the apparatus disclosed in my aforesaid prior application, the present apparatus possesses the further advantage of protecting the apparatus when driving thereof takes place reversibly, either forwardly or backwardly. It will be understood, however, that such reversibility may be obtained either through the employment of a reversible electric motor, as shown, or by other suitable means, whereby reversal in the direction of movement of the controlling belt drive is secured.

While I have set forth and described in detail a presently preferred embodiment of the present invention, nevertheless it will be understood that the mechanism so defined is subject to certain variation or modification without departing from the spirit of the invention, nor the scope thereof as disclosed in the following claims.

I claim:

1. A switch mechanism for reversible electric motor-driven endless belt drives, comprising: a frame, upper and lower arm members, means pivotally connecting said arm members intermediately of their length with said frame for swinging movement about horizontal axes, antifriction belt-engaging devices carried by the outer ends of said arm members for constant engagement with the opposite runs of an associated motor-driven belt passing between said arms, link means uniting said upper and lower arm members for movement in unison, spring means resisting swinging movement of said arm members in one direction and serving to cause said device to press against said belt runs to remove slack therefrom, said spring means including a sleeve element, a rod element slidably mounted in said sleeve element, compression springs arranged between shoulders carried by said elements, pivotal means uniting one of said elements with one of said arm members, pivotal means uniting the other of said elements of one of said arm members with said frame, and circuit controlling switch means actuated by oscillatory movement of said arm members in response to variations in operating positions of said arm members as the latter respond to changes in position of an associated endless belt.

2. Switch mechanism for controlling the operating circuit of an electric motor-driven, endless belt, power-transmitting means comprising: a frame; a pair of relatively spaced arms pivotally mounted intermediate their ends on said frame, said arms being arranged on opposite sides of an associated endless belt passing between them; belt-engaging devices carried by forward ends of said arms; link means joining said arms to maintain an established relation therebetween in all their various positions of operation; yieldable means carried by said frame and cooperative with each of said arms, said yieldable means serving to maintain the belt-engaging devices carried by the arms in inwardly pressing contact with belt runs in contact therewith; electric motor-driven means for imparting reversible movement to the runs of the associated belt; predetermined working loads applied to said belt serving to produce straightening switch-actuating movement on the part of one of said arms and slack take-up movement on the part of the other of said arms; and a motor-controlling switch means responsive ot the movement of either of said arms upon the straightening of a belt run engaged thereby to produce actuation of said switch means in arresting automatically the operation of the motor-driven means.

References Cited in the file of this patent

UNITED STATES PATENTS

| | | |
|---|---|---|
| 1,949,119 | Gibbs | Feb. 27, 1934 |
| 2,005,122 | Young et al. | June 18, 1935 |
| 2,111,009 | Smith | Mar. 15, 1938 |
| 2,329,280 | Lunken et al. | Sept. 14, 1943 |
| 2,525,327 | Weber | Oct. 10, 1950 |
| 2,594,974 | Mylting | Apr. 29, 1952 |
| 2,624,032 | Hennessy | Dec. 30, 1952 |
| 2,726,364 | Merritt | Dec. 6, 1955 |